United States Patent
Zheng et al.

(10) Patent No.: US 10,110,118 B2
(45) Date of Patent: Oct. 23, 2018

(54) CHARGE PUMP EFFECT COMPENSATION FOR HIGH FREQUENCY ISOLATION TRANSFORMER IN LIGHTING DEVICE POWER SUPPLIES

(71) Applicant: PHILIPS LIGHTING HOLDING B.V., Eindhoven (NL)

(72) Inventors: Sanbao Zheng, Eindhoven (NL); Bernhard Christiaan Van Dijk, Eindhoven (NL); Zhihua Song, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/509,404

(22) PCT Filed: Sep. 6, 2015

(86) PCT No.: PCT/IB2015/056803
§ 371 (c)(1),
(2) Date: Mar. 7, 2017

(87) PCT Pub. No.: WO2016/038523
PCT Pub. Date: Mar. 17, 2016

(65) Prior Publication Data
US 2017/0279347 A1    Sep. 28, 2017

Related U.S. Application Data

(60) Provisional application No. 62/049,074, filed on Sep. 11, 2014.

(51) Int. Cl.
*H02M 1/44* (2007.01)
*H02M 1/34* (2007.01)
*H02M 1/14* (2006.01)

(52) U.S. Cl.
CPC ............. *H02M 1/44* (2013.01); *H02M 1/14* (2013.01); *H02M 1/34* (2013.01)

(58) Field of Classification Search
CPC ............. H02M 1/44; H02M 1/14; H02M 1/34
(Continued)

(56) References Cited

U.S. PATENT DOCUMENTS 3,562,623 A   2/1971  Farnsworth
4,541,041 A   9/1985  Park et al.
(Continued)

OTHER PUBLICATIONS

Dianbo Fu et al, "A 700kHz High-Efficiency High-Power-Density Three-Level Parallel Resonant DC-DC Converter for High-Voltage Charging Applications"; Applied Power Electronics Conference, APEC 2007—Twenty Second Annual IEEE, Feb. 1, 2007, pp. 962-968.

(Continued)

*Primary Examiner* — John Poos
(74) *Attorney, Agent, or Firm* — Akarsh P. Belagodu

(57) ABSTRACT

An apparatus (400A, 400B, 400C, 400D, 500A, 500B, 800) supplies power to an output thereof. The apparatus includes: an isolation transformer (110) and a rectifier (120). The isolation transformer has a parasitic capacitance (Cp) between one of its input terminals (1S/1F) and one of its output terminals (2S/2F). The rectifier has a pair of input terminals connected to the output terminals of the isolation transformer, and a pair of output terminals connected across the apparatus' output. The rectifier includes a plurality of diodes (D1/D2/D3/D4) connected in a bridge. The apparatus also includes a compensation device for compensating for an increase in an output voltage across the output of the apparatus due to a charge pump effect of the parasitic capacitance. The compensation device includes at least one compensation capacitor (410, 510/520, 810/812) connected across one of the diodes of the bridge.

16 Claims, 8 Drawing Sheets

(58) Field of Classification Search
USPC ......... 327/382, 536; 315/239, 254, 294, 295
See application file for complete search history.

(56) References Cited

U.S. PATENT DOCUMENTS

| | | |
|---|---|---|
| 4,959,765 A | 9/1990 | Weinberg |
| 5,140,512 A | 8/1992 | O'Sullivan |
| 5,539,630 A | 7/1996 | Pietkiewicz |
| 8,120,278 B2 * | 2/2012 | Choi .................... H02M 3/285 |
| | | 315/200 R |

OTHER PUBLICATIONS

Ma K-W et al, "Novel, Technique for Sensing Inductor Current and DC Output Current of PWM DC-DC Converter", Proceedings of the Annual Applied Power Electronics Conference and Exhibition, (APEC)., Boston, Feb. 23-27, 1992; Proceedings of the Annual Applied Power Electronics Conf and Exhibition (APEC), NY, NY, IEEE, US. vol. Conf. 7, Feb. 23, 1992, pp. 345-351.

* cited by examiner

US 10,110,118 B2

CHARGE PUMP EFFECT COMPENSATION FOR HIGH FREQUENCY ISOLATION TRANSFORMER IN LIGHTING DEVICE POWER SUPPLIES

CROSS-REFERENCE TO PRIOR APPLICATIONS

This application is the U.S. National Phase application under 35 U.S.C. § 371 of International Application No. PCT/IB2015/056803, filed on Sep. 6, 2015 which claims the benefit of Provisional Patent Application No. 62/049,074, filed on Sep. 11, 2014. These applications are hereby incorporated by reference herein.

TECHNICAL FIELD

The present invention is directed generally to power supplies for lighting devices (e.g., light emitting diode (LED) lighting devices) and other switching mode power supplies where the input is isolated from the output by a high frequency isolation transformer. More particularly, various inventive methods and apparatus disclosed herein relate to devices and methods of charge pump effect compensation for a high frequency isolation transformer in power supplies for lighting devices (e.g., LED lighting devices) and other switching mode power supplies.

BACKGROUND

For safety consideration, in many or most power supplies for LED lighting devices and other switching mode power supplies the input is isolated from the output by a high frequency isolation transformer. This isolation transformer receives on its primary side high frequency (e.g., 40-100 kHz) AC electrical power, for example AC electrical power generated by an inverter, and outputs the AC electrical power to a rectifier on its secondary side. A low-ripple DC output from the rectifier is obtained by providing a filter or smoothing capacitor across the rectifier's output.

Stray capacitance exists between the primary and secondary windings of an isolation transformer. This stray capacitance is distributed in a way that depends on the isolation transformer construction (e.g., how the isolation transformer is wound).

In some cases, this stray capacitance can produce a charge pump effect which leads to an undesired increase in the output voltage of the rectifier when the output of the rectifier is unloaded or lightly loaded.

This high output voltage caused by this charge pump effect may be a violation of maximum output voltage specification for the power supply. Furthermore, when one of the windings (primary, secondary, or other auxiliary windings) of the isolation transformer is used to sense the output voltage, the sensed peak voltage will no longer be proportional to the actual output voltage since the voltage across the secondary winding is less than the output voltage due to the charge pump effect.

A traditional solution to this problem is using a dummy load at the output (i.e., output of the rectifier) which is large enough so that voltage drop across this dummy load caused by the charge pump current is less than the required no-load (open circuit) output voltage. This approach, however, causes a lot of wasted power dissipation and can impose substantial thermal stress on the dummy load.

Thus, there is a need in the art to provide compensation for an increase in an output voltage across the output of a power supply for a lighting device (e.g., an LED lighting device) or other switching mode power supply due to a charge pump effect of a parasitic capacitance of the isolation transformer.

SUMMARY

The present disclosure is directed to inventive methods and apparatus for compensating for an increase in an output voltage across the output of a power supply for a lighting device (e.g., an LED lighting device) or other switching mode power supply due to a charge pump effect of a parasitic capacitance of the isolation transformer.

Generally, in one aspect, an apparatus for supplying power to a light emitting diode (LED) load comprises: an isolation transformer, a rectifier, and first and second capacitors. The isolation transformer has a pair of input terminals configured to receive AC electrical power, and also has a pair of output terminals, and the isolation transformer provides DC isolation between the input terminals at a primary side thereof and the output terminals at a secondary side thereof. The rectifier has a pair of input terminals and a pair of output terminals. The input terminals of the rectifier are connected to the output terminals of the isolation transformer and the output terminals of the rectifier are connected across the LED load. The rectifier comprises: a first diode connected from a first one of the input terminals of the rectifier to a first one of the output terminals of the rectifier, a second diode connected from a second one of the input terminals of the rectifier to the first one of the output terminals of the rectifier, a third diode connected from a second one of the output terminals of the rectifier to the first one of the input terminals of the rectifier, and a fourth diode connected from the second one of the output terminals of the rectifier to the second one of the input terminals of the rectifier. The first capacitance of the first capacitor is approximately the same as a second capacitance of the second capacitor, and either: the first capacitor is connected across the first diode and the second capacitor is connected across the second diode, or the first capacitor is connected across the third diode and the second capacitor is connected across the fourth diode.

Generally, in another aspect, an apparatus for supplying power to an LED load comprises: an isolation transformer, a rectifier, and a compensation capacitor. The isolation transformer has a pair of input terminals configured to receive AC electrical power, and also has a pair of output terminals. The isolation transformer provides DC isolation between the input terminals at a primary side thereof and the output terminals at a secondary side thereof. The isolation transformer has a parasitic capacitance between one of its input terminals and one of its output terminals. The rectifier has a pair of input terminals and a pair of output terminals. The input terminals of the rectifier are connected to the output terminals of the isolation transformer and the output terminals of the rectifier are connected across the LED load. The rectifier comprises a plurality of diodes connected in a diode bridge. The compensation capacitor is connected across one of the diodes of the diode bridge, and the capacitance of the compensation capacitor is about the same as the parasitic capacitance.

Generally, in yet another aspect, an apparatus for supplying power to an output includes an isolation transformer and a rectifier. The isolation transformer has a parasitic capacitance between one of its input terminals and one of its output terminals. The rectifier has a pair of input terminals and a pair of output terminals. The input terminals of the rectifier are connected to the output terminals of the isolation transformer and the output terminals of the rectifier are connected across the output of the apparatus. The rectifier includes a plurality of diodes connected in a bridge. The apparatus also includes a compensation device for compensating for an increase in an output voltage across the output of the apparatus due to a charge pump effect of the parasitic capacitance. The compensation device includes at least one compensation capacitor connected across one of the diodes of the bridge.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "about" as used herein means within +/−25 percent of a nominal value. More specifically, when two values are said to be about the same, it is understood to mean that they are within +/−25 percent of each other. Similarly, when a first value is said to be "about the same" as a second value, it mean that the first value is within +/−25 percent of the second value.

The term "approximately" as used herein means within +/−10 percent of a nominal value. More specifically, when two values are said to be approximately the same, it is understood to mean that they are within ten percent of each other. Similarly, when a first value is said to be "approximately the same" as a second value, it mean that the first value is within +/−10 percent of the second value.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As described above, stray capacitance of an isolation transformer of a power supply for a lighting device (e.g., an LED lighting device) or other switching mode power supply can produce a charge pump effect which leads to an undesired increase in the output voltage of the rectifier when the output of the rectifier is unloaded or lightly loaded. This high output voltage caused by this charge pump effect may be a violation of maximum output voltage specification for the power supply. Furthermore, when one of the windings (primary, secondary, or other auxiliary windings) of the isolation transformer is used to sense the output voltage, the sensed peak voltage will no longer be proportional to the actual output voltage since the voltage across the secondary winding is less than the output voltage due to the charge pump effect.

More generally, Applicants have recognized and appreciated that it would be beneficial to compensate for an increase in an output voltage across the output of a power supply for a lighting device (e.g., an LED lighting device) or other switching mode power supply due to a charge pump effect of a parasitic capacitance of an isolation transformer of the power supply.

In view of the foregoing, various embodiments and implementations of the present invention are directed to methods and apparatus for compensating for an increase in an output voltage across the output of a power supply for a lighting device (e.g., an LED lighting device) or other switching mode power supply due to a charge pump effect of a parasitic capacitance of the isolation transformer.

Figure 1:
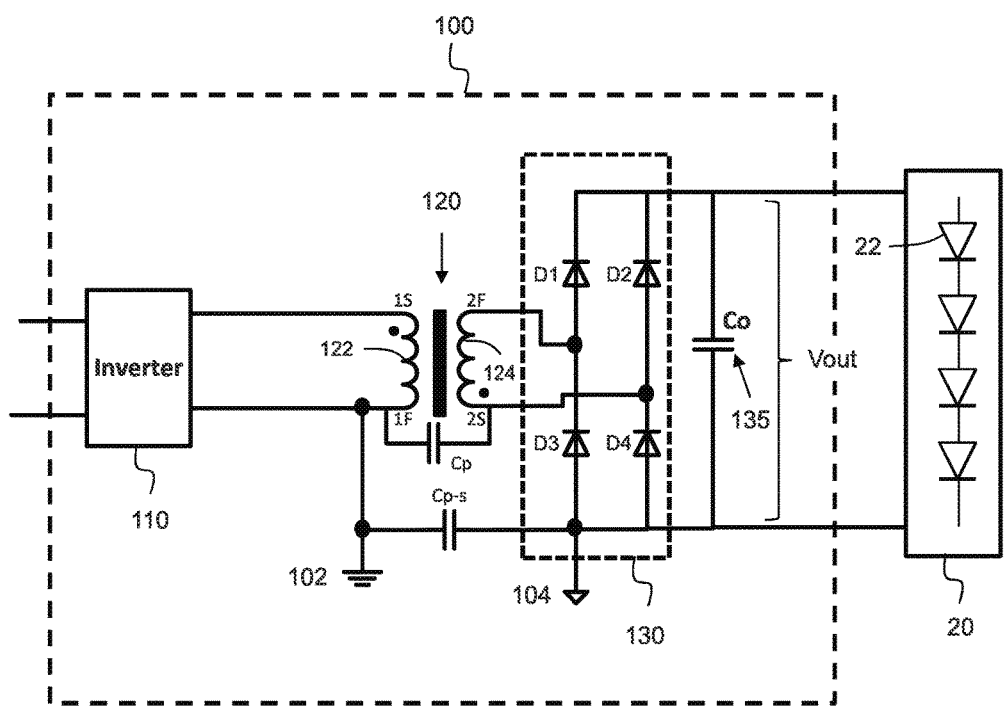
FIG. 1 illustrates an example of an apparatus which includes an isolating power supply supplying power to a light emitting diode (LED) load.

FIG. 1 illustrates an example of an apparatus 10 which includes an isolating power supply 100 supplying power to a light emitting diode (LED) load 20. Here the term "isolating power supply" is understood to mean a power supply which is configured to receive electrical power at an input side thereof and to supply electrical power (e.g., to an LED load) at an output side thereof, and which provides galvanic isolation between the input side and the output side in the absence of parasitic effects, for example for safety reasons. Here, apparatus 10 may comprise a lighting unit, including for example a lighting fixture.

Isolating power supply 100 includes an inverter 110, an isolation transformer 120, a rectifier 130, and a filter or smoothing capacitor (Co) 135.

In some embodiments, inverter 110 may be replaced by another AC electrical power source, or may be eliminated—in which case isolating power supply 100 receives AC electrical power from an external source or supply.

Isolation transformer 120 includes at least a first or primary winding 122 at a primary or input side thereof and a second or secondary winding 124 at a secondary or output side thereof. In some embodiments isolation transformer 120 may include additional auxiliary windings for example for sensing one or more current or voltages of isolating power supply 100.

Rectifier 130 is a full wave rectifier configured as a diode bridge. Rectifier 130 has a pair of input terminals and a pair of output terminals, wherein the input terminals of the rectifier are connected to the output terminals of isolation transformer 120 and the output terminals of the rectifier are connected across LED load 20. The rectifier comprises: a first diode D1 connected from a first one of the input terminals of rectifier 130 to a first one of the output terminals of rectifier 130, a second diode D2 connected from a second one of the input terminals of rectifier 130 to the first one of the output terminals of rectifier 130, a third diode D3 connected from a second one of the output terminals of rectifier 130 to the first one of the input terminals of rectifier 130, and a fourth diode D4 connected from the second one of the output terminals of rectifier 130 to the second one of the input terminals of rectifier 130.

In some embodiments, LED load 20 includes a plurality of LEDs 22 connected in one or more strings. LEDs 22 may include any desired combination of white and/or colored LEDs to produce a desired colored light of a desired intensity. In a case where LED load 20 produces white light, the color temperature may be selected to have a desired value by appropriate choices of the various LEDs which are employed. In alternative embodiments, LED load 20 may be replaced by a different load, including for example other lighting devices besides LEDs.

Although not shown in FIG. 1, in some embodiments apparatus 10 may include a controller having one or more processors for controlling the electrical power which is supplied to LED load 20 to produce a desired lighting effect. In some embodiments apparatus 10 may also include one or more current and/or voltage sensors for sensing appropriate voltage(s) and/or current(s) in apparatus 10 to provide feedback for such a controller. In some embodiments, such a processor may be provided external to apparatus 10.

In operation, inverter 110 receives at its input DC electrical power and outputs high frequency AC electrical power to the input of isolation transformer 120. In some embodiments, the DC electrical power received by inverter 110 has a voltage of about 460V and AC electrical power output by inverter has a voltage regulated at a certain level according to output requirements. In some embodiments, the frequency of the high frequency AC electrical power is at least 10 kHz. In some embodiments, the frequency of the high frequency AC electrical power is between approximately 40 kHz and approximately 100 kHz.

Isolation transformer 120 provides galvanic isolation between the input side thereof at primary winding 122 and the secondary side thereof at secondary winding 124. More specifically, isolation transformer 120 provides galvanic isolation between the output of inverter 110 and the rectifier 130 and LED load 20.

On the primary side of isolation transformer 120, voltages may be referenced to a primary ground 102, while on the secondary side of isolation transformer 120 voltages may be referenced to a secondary ground 104 which is different from primary ground 102. In some embodiments, apparatus 100 may further include one or more safety capacitors between primary ground 102 and earth ground, and one or more additional safety capacitors between secondary ground 104 and earth ground. In some other embodiments, primary ground 102 may be directly tied to secondary ground 104 with one or more safety capacitors. These safety capacitors provide electromagnetic noise reduction for apparatus 10. The capacitance formed by these safety capacitors is represented by Cp-s between primary ground 102 and secondary ground 104, as shown in FIG. 1.

Furthermore, a stray capacitance exists between the primary and secondary windings 122 and 124 of isolation transformer 120. This stray capacitance is distributed in a way depending on the construction of isolation transformer 120 (e.g., how isolation transformer 120 is wound). This distributed stray capacitance can be represented as a single capacitance Cp as shown in FIG. 1. This stray capacitance Cp can be connected between any two pins of isolation transformer 120 across the primary and secondary windings 122 and 124 depending on the way isolation transformer 120 is constructed (e.g., how isolation transformer 120 is wound), for example, 1S to 2S, 1F to 2F, etc. It should be understood that the connection of Cp from 1F to 2S which is illustrated in FIG. 1 is only one representative connection.

Parasitic capacitances Cp and CP-s together with other circuit components form a charge pump and boost the output voltage Vout across smoothing capacitor 135 and the output of rectifier 130 when the isolating power supply 100 is open loaded (LED load 20 missing or open circuited, e.g., due to a component failure) or lightly loaded, as will be explained below with respect to FIGS. 2A, 2B and 3, where it is assumed that the output of rectifier 130 is lightly loaded.

Figure 2A:
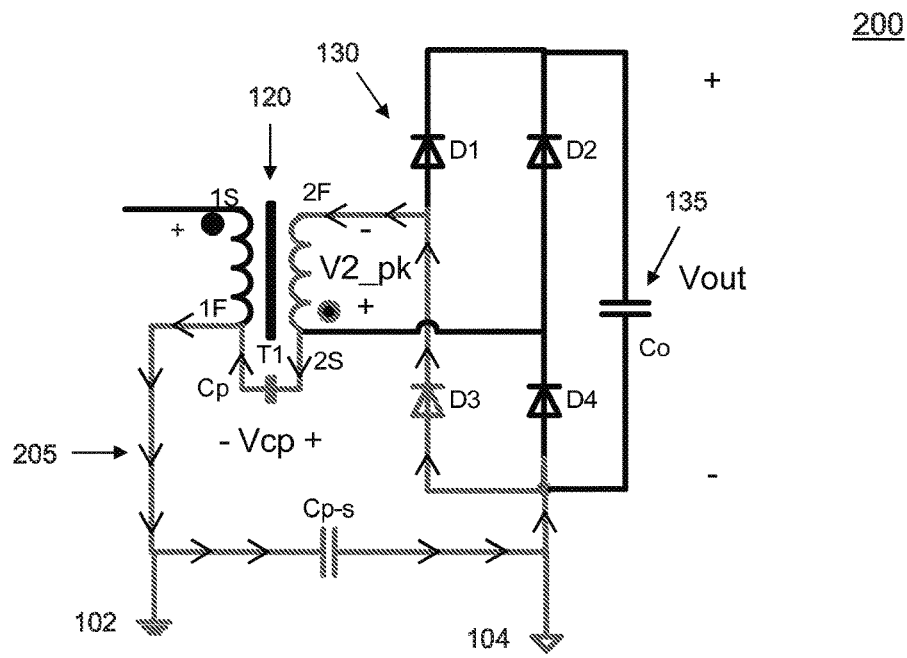
FIG. 2A illustrates a portion of an example of isolating power supply with annotations illustrating a current path during a charging interval of a charge pump created by parasitic capacitances.

FIG. 2A illustrates a circuit 200 which is a portion of an example of isolating power supply 100 with annotations or arrows 205 illustrating a current path during a charging interval of a charge pump created by the parasitic capacitances Cp and Cp-s. Reference numbers and characters in FIG. 2A that are the same as in FIG. 1 designate the same elements and features, a description of which will not be repeated. The charging interval represents one half of a period of the AC electrical power which is supplied to circuit 200 (e.g., by inverter 110).

Figure 2B:
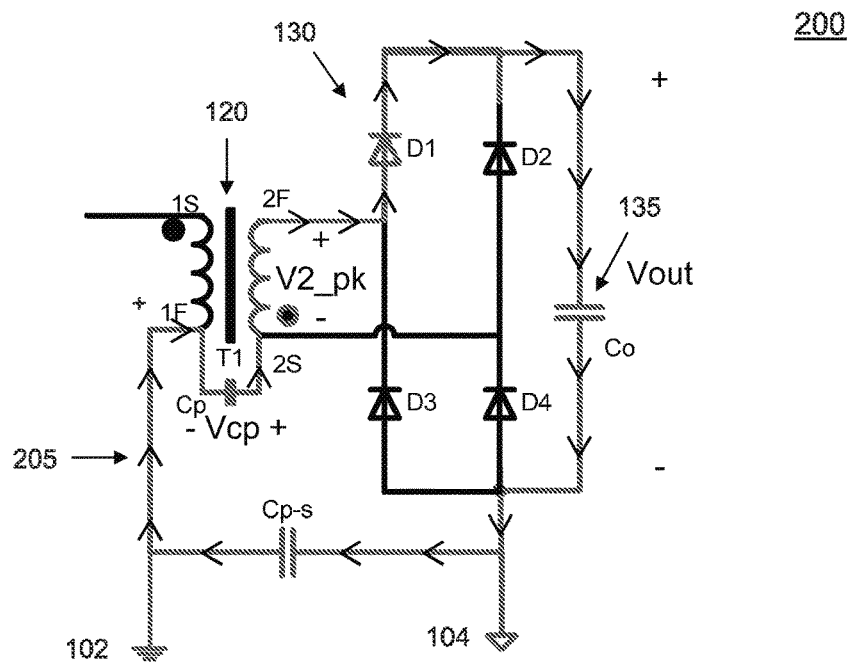
FIG. 2B illustrates a portion of an example of isolating power supply with annotations illustrating a current path during a discharging interval of a charge pump effect created by parasitic capacitances.

During the charging interval the 1S and 2S ends of the primary and secondary windings 122 of isolation transformer 120, labeled with a dot in FIGS. 2A and 2B, are positive and the charging path is identified by the direction of the arrows 205 in FIG. 2A. Charging current provided by secondary winding 124 flows out of the "2S" end of secondary winding 124 and passes through Cp, Cp-s, D3, and comes back to the "2F" end of secondary winding 124. As will be explained in greater detail below with respect to FIG. 3, since Cp-s is much bigger than Cp, Cp is charged up close to the peak voltage (V2_pk) across secondary winding 124, and the voltage across Cp-s stays almost unchanged. Due to the charge pump effect that will be explained in the discharging interval below, the output voltage Vout is bigger than V2_pk, and therefore no current flows through smoothing capacitor 135 in the charging interval.

FIG. 2B illustrates the behavior of circuit 200 of isolating power supply 100 with annotations or arrows 205 illustrating a current path during a discharging interval of a charge pump effect created by parasitic capacitances Cp and Cp-s. Reference numbers and characters in FIG. 2B that are the same as in FIG. 1 designate the same elements and features, a description of which will not be repeated. The discharging interval represents one half of a period of the AC electrical power which is supplied to circuit 200 (e.g., by inverter 110).

During the discharging interval, the "non-dot" ends of primary and secondary windings 122 of isolation transformer 120 (1F and 2F ends) are positive and the discharging path is identified by the direction of the arrows 205 in FIG. 2B. Discharging current goes out of Cp and flows through secondary transformer winding 124, D1, smoothing capacitor 135, Cp-s, and comes back to Cp. Again, the voltage across Cp-s stays almost unchanged and the charge in Cp is discharged to smoothing capacitor 135. It should be noted that in the case where circuit 200 is lightly loaded, part of the charge remains in the capacitor Cp at the end of the discharging interval. Cp is fully discharged only when the load is greater than a required minimum load for eliminating the charge pump effect, as given in equation 1 below. During this discharging process the voltage across Cp is positive and in the same direction as the voltage across secondary transformer winding 124. As will be explained in greater detail below with respect to FIG. 3, the peak voltage across secondary transformer winding 124 is still V2_pk due to the symmetry of the transformer voltage in a switching cycle. Therefore the total voltage seen by smoothing capacitor 135 is (V2_pk+Vcp), and the peak is larger than V2_pk. This results in an output voltage Vout which is greater than V2_pk. As explained above, this is undesirable.

The minimum load current necessary to eliminate the charge pump effect is:

$$I(\text{min\_load}) = V2\_pk * Cp * Fsw, \text{ where } Fsw \text{ is the switching frequency of the circuit;} \quad (1)$$

As long as the output current is less than this minimum load current l(min_load), the output voltage Vout will be higher than V2_pk.

Figure 3:
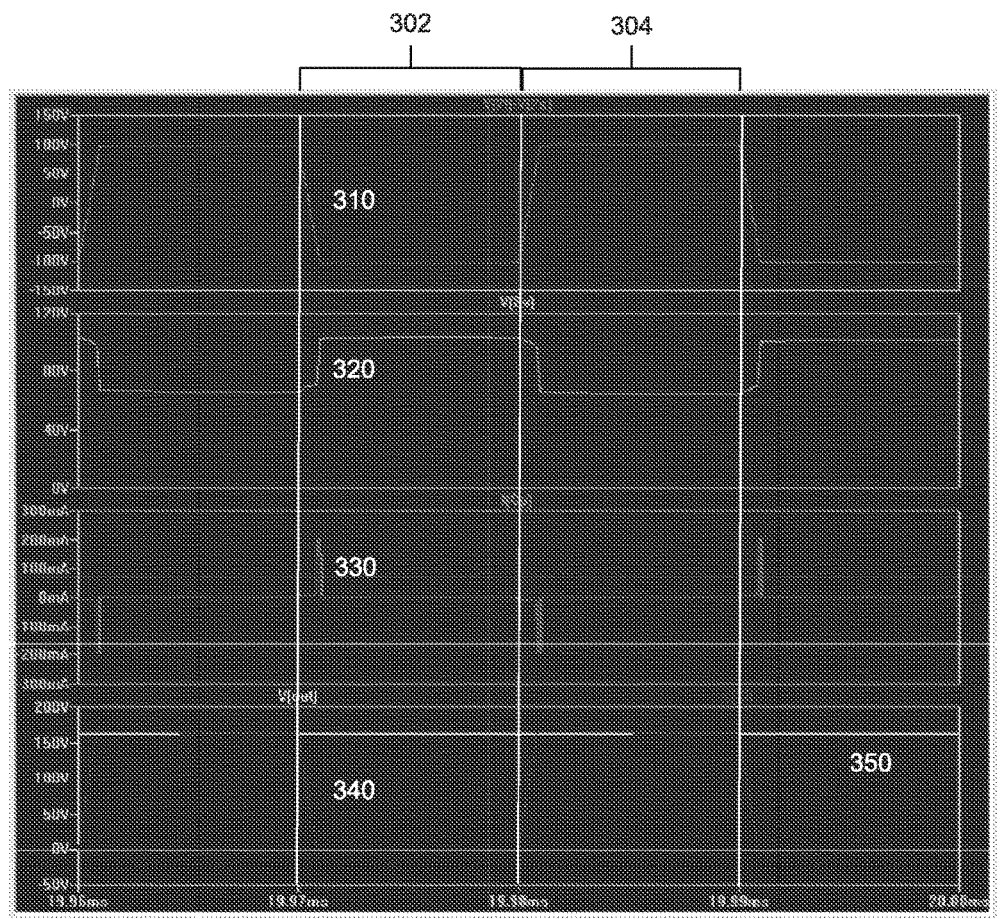
FIG. 3 illustrates simulated examples of voltage and current waveforms for the portion of an example of isolating power supply during the charging and discharging intervals of the charge pump effect created by parasitic capacitances, as illustrated in FIGS. 2A and 2B.

FIG. 3 illustrates simulated examples of voltage and current waveforms for circuit 120 during a charging interval 302 and a discharging interval 304 of the charge pump effect created by parasitic capacitances Cp and Cp-s, as illustrated in FIGS. 2A and 2B. In the example illustrated in FIG. 3, it is assumed that the input AC voltage provided to primary winding 122 is 100V in magnitude and 50 kHz in frequency. It is also assumed that isolation transformer 120 has a 1:1 turns ratio between primary winding 122 and secondary winding 124.

FIG. 3 shows five waveforms 310, 320, 330, 340 and 350, stacked vertically and synchronized in time. In FIG. 3, the horizontal axis (x-axis) represents time and the vertical axis (y-axis) represents voltage or current, depending on the waveform. For discussion to follow, we consider a full switching period of the AC electrical power from 19.97 ms to 19.99 ms, including a charging interval from 19.97 ms to 19.98 ms and a discharge interval from 19.98 ms to 19.99 ms.

The first waveform 310 shows V2_pk, which is a reflected voltage of primary winding 122. As mentioned above, it is seen that the input AC voltage provided to primary winding 122 is 100 VAC in magnitude and 50 kHz in frequency, The second waveform 320 shows Vcp, the voltage across parasitic capacitance Cp. Note the lower voltage of the voltage pulses during a discharge interval 304 is not zero but about 65V. This is because parasitic capacitance Cp is not completely discharged during discharging interval 304. Parasitic capacitance Cp can only be discharged to LED load 20 during discharging interval 304. When LED load 20 is missing, open, or too light (not a low enough impedance to dump all the charge which built up in parasitic capacitance Cp in charging interval 302), a DC voltage remains across parasitic capacitance Cp at the end of discharging interval 304. This DC voltage added to the V2_pk to make the output voltage Vout greater than V2_pk during the discharging cycle.

The third waveform 330 shows the charging and discharging current through parasitic capacitance Cp. Positive pulses represent the charging current, and negative pulses represent the discharging current. At steady state, the charging current is equal to the discharging current. Note: the DC voltage across parasitic capacitance Cp is charged up during the transient time when circuit 200 has not reached steady state yet.

The fourth waveform 340 shows the voltage across D3, which is the sum of the V2_pk (100V) and Vcp during discharging interval 304. Due to the non-zero Vcp (about 65V), this voltage is about 165V during discharging interval 304, and as a result Vout (shown in fifth waveform 350) remains at about 165V during the entire switching period of the AC electrical power, much higher than V2_pk (100V).

Figure 4A:
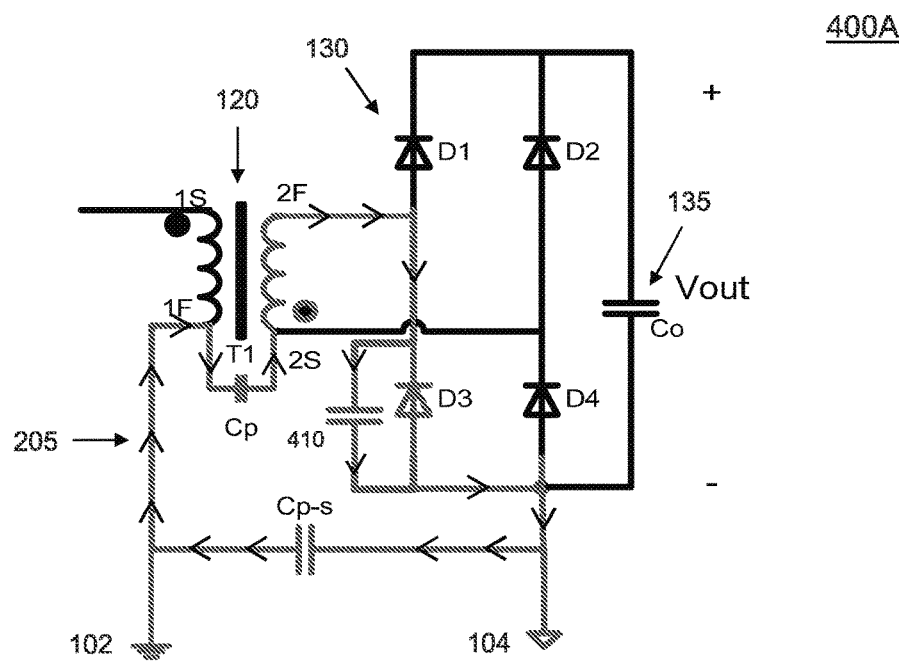
FIGS. 4A-D illustrate some example embodiments of a circuit of an isolating power supply with compensation means for compensating for an increase in an output voltage due to a charge pump effect created by parasitic capacitances.

FIG. 4A illustrates an example embodiment of a circuit 400A of an isolating power supply which includes a compensation element for compensating for an increase in an output voltage due to a charge pump effect created by parasitic capacitances. Reference numbers and characters in FIG. 4A that are the same as in FIG. 1 designate the same elements and features, a description of which will not be repeated.

Circuit 400A includes a compensation capacitor 410 which is connected across diode D3 (in parallel with diode D3) of rectifier 130.

FIG. 4A illustrates the behavior of a circuit 400A with annotations or arrows 205 illustrating a current path during a discharging interval of a charge pump effect created by parasitic capacitances Cp and Cp-s. As can be seen from arrows 205, during the discharging interval, the charge which has built up in parasitic capacitance Cp during the charging interval is dumped to compensation capacitor 410 and as a result no charge is transferred to smoothing capacitor 135. Accordingly, the voltage across smoothing capacitor 135 is equal to the peak voltage of winding 2 (V2_pk).

Beneficially, the capacitance of compensation capacitor 410 should be close to the parasitic capacitance Cp. If the capacitance of compensation capacitor 410 is less than the parasitic capacitance Cp, then a part of the charge in parasitic capacitance Cp will still be transferred to smoothing capacitor 135. If the capacitance of compensation capacitor 410 is larger than the parasitic capacitance Cp, then an equivalent capacitance of $C_{Diff}$=(capacitance of compensation capacitor 410)–(parasitic capacitance Cp) will cause the same charge pump effect with the difference that the charging and discharging intervals will be reversed.

Accordingly, in some embodiments, the capacitance of compensation capacitor 410 is about the same as the parasitic capacitance Cp. In some embodiments, the capacitance of compensation capacitor 410 is approximately the same as the parasitic capacitance Cp. In some embodiments, the capacitance of compensation capacitor 410 equals the parasitic capacitance Cp, within a component tolerance value of compensation capacitor 410.

Figure 4B:
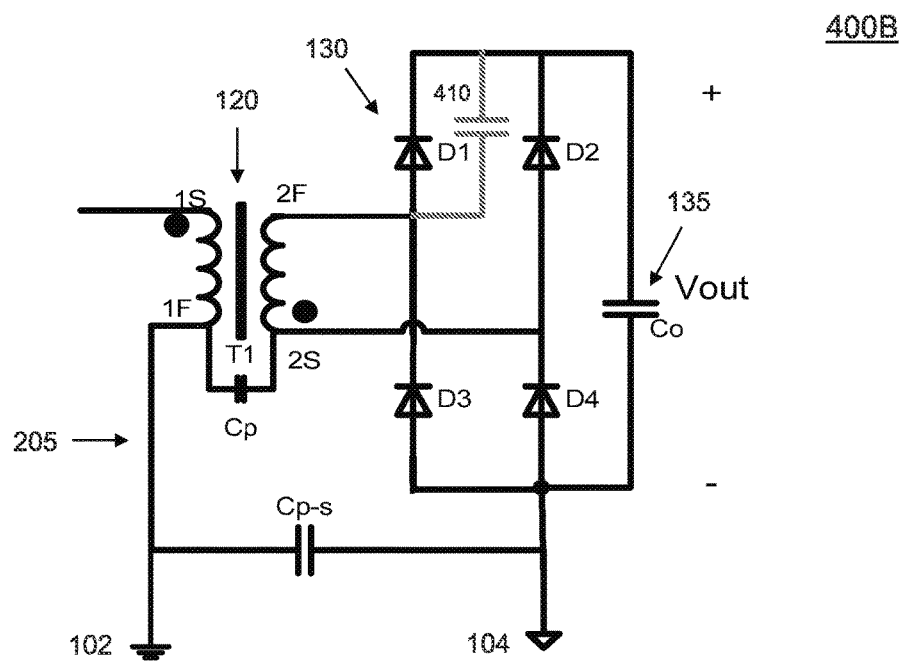

Due to the symmetry of circuit 400A, in an alternative embodiment compensation capacitor 410 can be connected across diode D1 (in parallel with diode D1). FIG. 4B illustrates such an alternative circuit 400B where capacitor 410 is connected across diode D1. In FIG. 4B the same reference numbers and characters are employed as in FIG. 4A.

However, moving compensation capacitor 410 to the other leg of rectifier 130 (i.e., across diode D2 or diode D4) will not work under the particular stray capacitance configuration shown in FIGS. 4A and 4B (i.e., where parasitic capacitance Cp is connected between 1F and 2S).

Figure 4C:
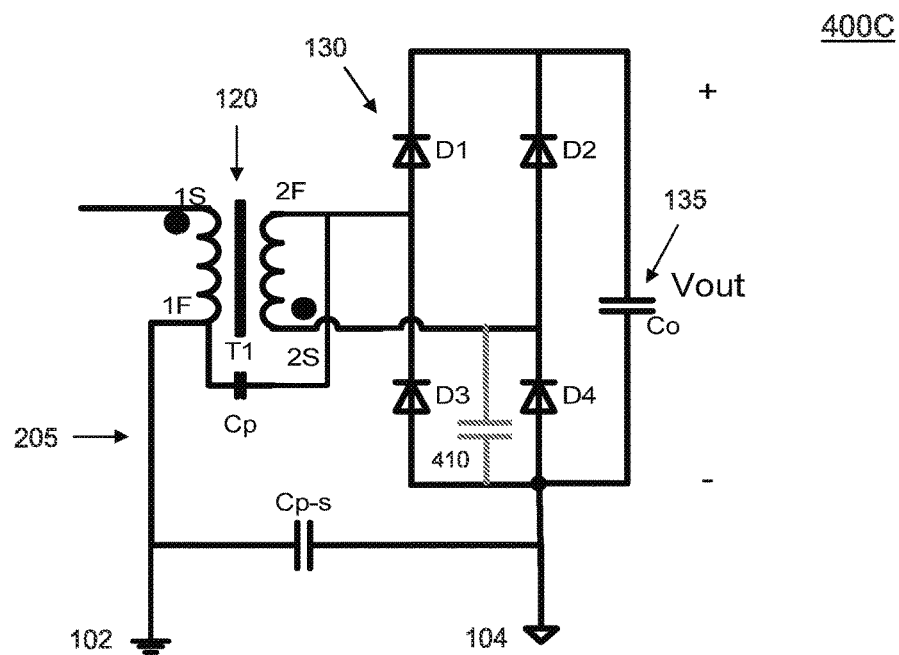
Figure 4D:
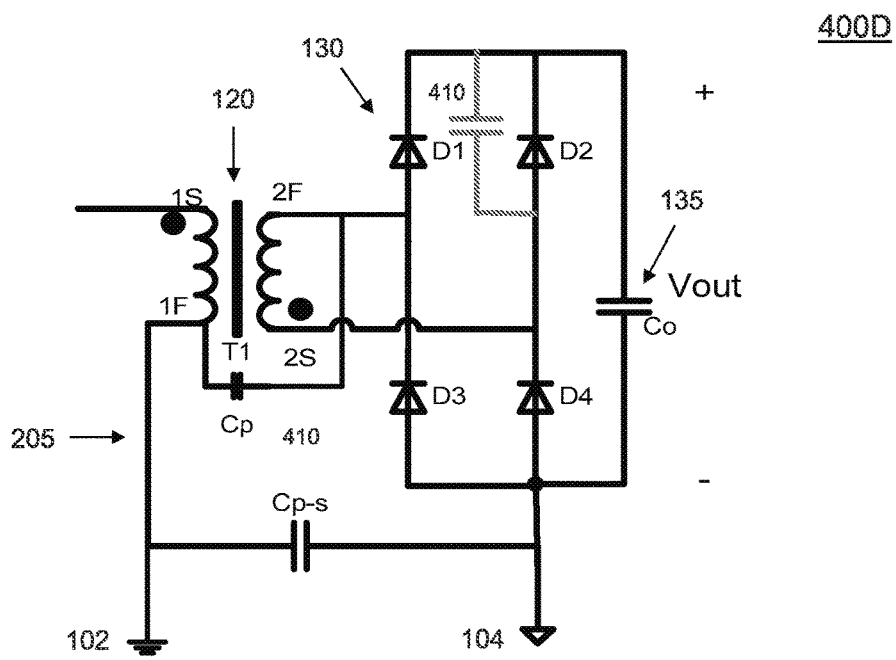

However in other configurations of isolation transformer 120, for example where primary and secondary windings 122 and 124 are wound differently, the stray capacitor Cp will appear across a different pair of terminals of isolation transformer 120. In that case, the compensation capacitor would need to be connected across the other leg of rectifier 130 (i.e., across diode D2 or diode D4) in order to work. FIGS. 4C and 4D illustrate alternative circuits 400C and 400D, where capacitor 410 is connected across diode D4 in FIG. 4C and connected across diode D2 in FIG. 4D. In FIGS. 4C and 4D the same reference numbers and characters are employed as in FIG. 4A.

Thus it is seen that in these embodiments where the compensation means is a compensation capacitor which is connected across one of the diodes of rectifier 130: (1) the capacitance of the compensation capacitor should be reasonably close to the parasitic capacitance Cp; and (2) the compensation capacitor needs to be provided on a particular "leg" of rectifier 130 depending on the construction/configuration of isolation transformer 120. In practice, the parasitic capacitance Cp may be unknown and/or may vary significantly from isolation transformer 120 to isolation transformer 120, or from circuit to circuit. Accordingly, it may be difficult in some cases to insure that the capacitance of the compensation capacitor is reasonably close to the parasitic capacitance Cp.

Figure 5A:
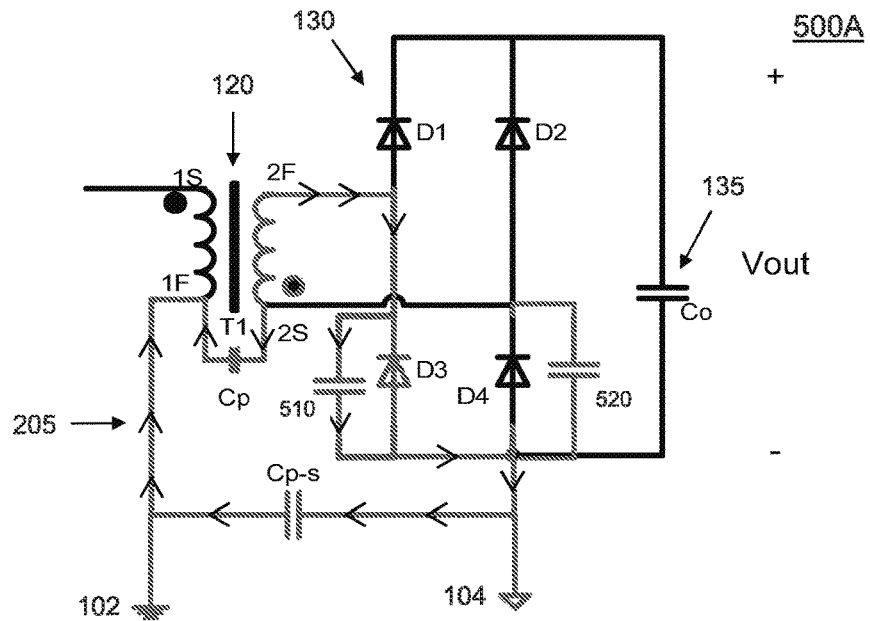
FIGS. 5A-B illustrate some additional example embodiments of a circuit of an isolating power supply with compensation means for compensating for an increase in an output voltage due to a charge pump effect created by parasitic capacitances.
Figure 5B:
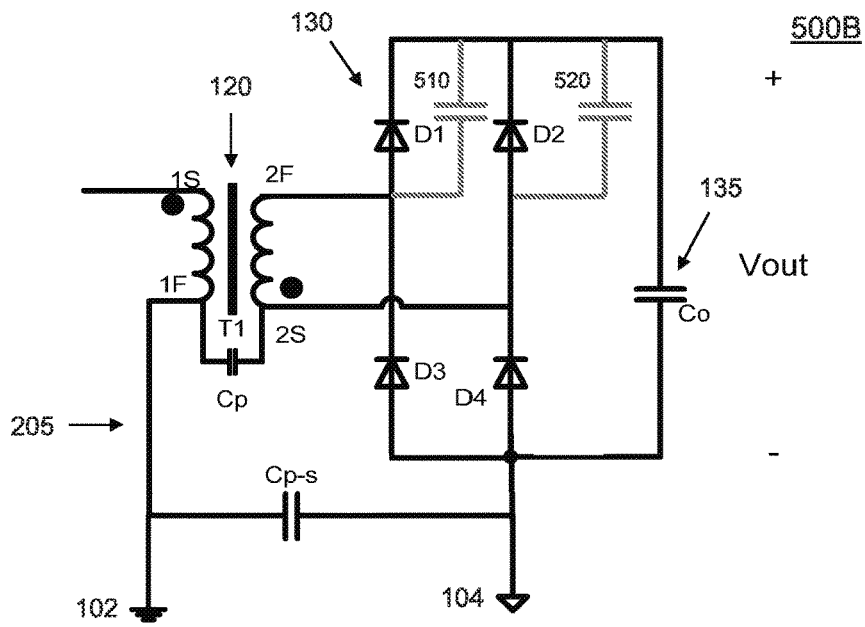

To eliminate these two conditions, FIGS. 5A and 5B illustrate additional embodiments which use a compensation capacitor on each leg of rectifier 130.

FIG. 5A illustrates a circuit 500A of an isolating power supply which includes compensation elements for compensating for an increase in an output voltage due to a charge pump effect created by parasitic capacitances. Reference numbers and characters in FIG. 5 that are the same as in FIG. 1 designate the same elements and features, a description of which will not be repeated.

Circuit 500A includes as compensation means a first compensation capacitor 510 which is connected across diode D3 (in parallel with diode D3) of rectifier 130 and a second compensation capacitor 520 which is connected across diode D4 (in parallel with diode D4) of rectifier 130.

Beneficially, the capacitance values of first and second compensation capacitors 510 and 520 should be close to each other and much greater than parasitic capacitance Cp. In this solution the charge in parasitic capacitance Cp is absorbed by the larger capacitance C3 or C4, depending on the way the stray capacitance Cp is connected across the various terminals of isolation transformer 120, according to the configuration/construction of isolation transformer 120 (e.g., how isolation transformer 120 is wound). As a result, no significant charge is transferred to smoothing capacitor 135 and the output voltage Vout is close to the peak voltage V2_pk of secondary winding 124.

Accordingly, in some embodiments, the capacitance of first compensation capacitor 510 is about the same as the capacitance of second compensation capacitor 520. In some embodiments, the capacitance of first compensation capacitor 510 is approximately the same as the capacitance of second compensation capacitor 520. In some embodiments, the capacitance of first compensation capacitor 510 equals the capacitance of second compensation capacitor 520, within a component tolerance value of first and second compensation capacitors 510 and 520.

Furthermore, in some embodiments the capacitance of first compensation capacitor 510 and the capacitance of second compensation capacitor 520 are each at least twice the parasitic capacitance Cp. In some embodiments, the capacitance of first compensation capacitor 510 and the capacitance of second compensation capacitor 520 are each at least approximately ten times the parasitic capacitance Cp.

In an alternative embodiment as illustrated in FIG. 5B, first compensation capacitor 510 can be connected across diode D1 (in parallel with diode D1) and second compensation capacitor 520 can be connected across diode D2 (in parallel with diode D2).

Beneficially, circuit 500A which includes as compensation means first and second compensation capacitors 510 and 520 has an advantage that it will compensate for a charge pump effect caused by parasitic capacitance regardless of how isolation transformer 120 is configured or constructed. Furthermore, it is not necessary to know and precisely match the value of parasitic capacitance Cp—all that is needed is that the capacitance values of first and second compensation capacitors 510 and 520 should be close (preferably equal) to each other and much greater than parasitic capacitance Cp.

Figure 6:
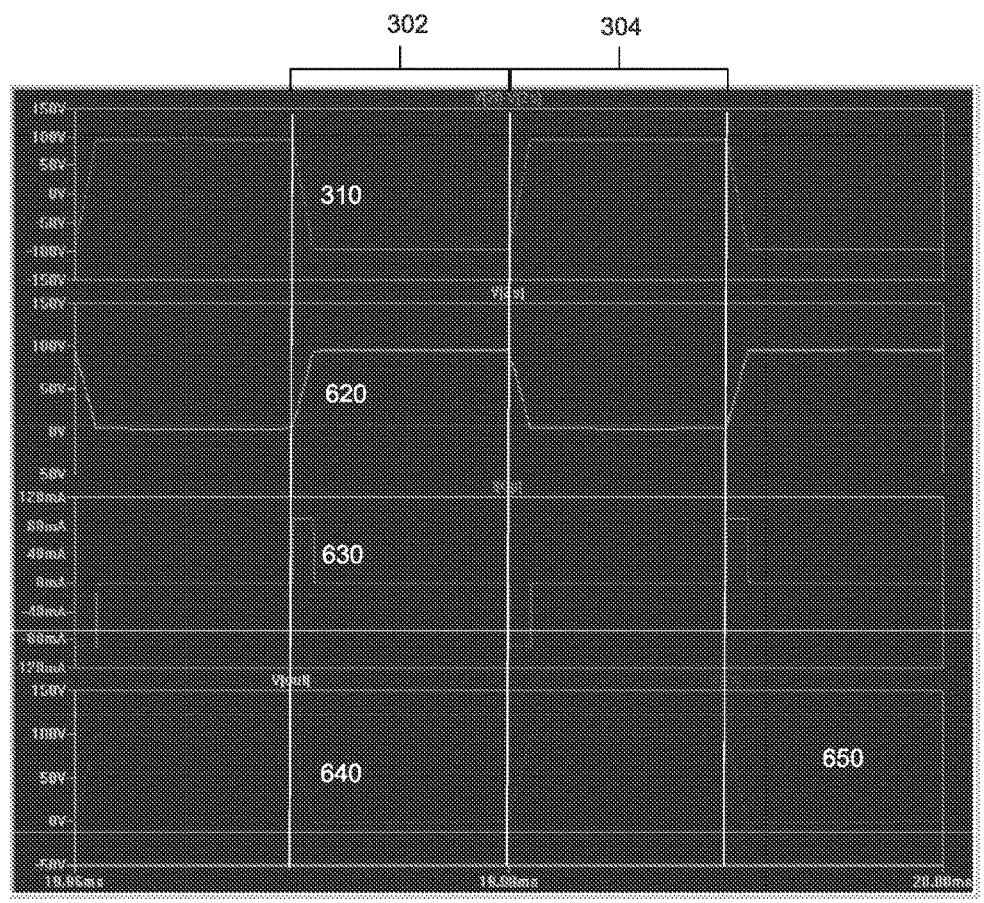
FIG. 6 illustrates simulated examples of voltage and current waveforms for the example embodiments of an isolating power supply with compensation means for compensating for an increase in an output voltage due to a charge pump effect created by parasitic capacitances illustrated in FIGS. 4 and 5.

FIG. 6 illustrates simulated examples of voltage and current waveforms for the example embodiments of an isolating power supply with compensation means for compensating for an increase in an output voltage due to a charge pump effect created by parasitic capacitances which are illustrated in FIGS. 4 and 5.

FIG. 6 shows five waveforms 310, 620, 630, 640 and 650, stacked vertically and synchronized in time. In FIG. 6, the horizontal axis (x-axis) represents time and the vertical axis (y-axis) represents voltage or current, depending on the waveform. For discussion to follow, we consider a full switching period of the AC electrical power from 19.97 ms to 19.99 ms, including a charging interval from 19.97 ms to 19.98 ms and a discharge interval from 19.98 ms to 19.99 ms.

In FIG. 6, the first waveform 310 shows V2_pk (the same as in FIG. 3), the second waveform 620 shows Vcp, the third waveform 630 shows the charging and discharging current through parasitic capacitance Cp, the fourth waveform 640 shows the voltage across diode D3, and the fifth waveform 650 shows the output voltage Vout.

The major significant differences between the waveforms shown in FIG. 6 and the corresponding ones shown in FIG. 3 are as follows.

In the second waveform 620, the bottom level of the voltage VCP during discharge interval 304 is zero. This is because all the charge in parasitic capacitance Cp is dumped to first compensation capacitor 510 during discharging interval 304.

In the fourth waveform 640, the voltage across diode D3 is now equal to V2_pk during discharging interval 304 because the voltage across parasitic capacitance Cp is completely discharged to zero.

The fifth waveform 650, Vout, follows V2_pk at 100V. Accordingly, an increase in the output voltage caused by a charge pump effect of the parasitic capacitor Cp is compensated, and the output voltage is not increased.

From the analysis provide above, the required minimum load current for eliminating the charge pump effect is directly proportional to output voltage Vout, the switching frequency, and the stray capacitance Cp of the isolation transformer. The output voltage Vout typically is determined by design requirements and cannot be changed, but the other two factors can be used to a certain extent to improve this charge pump effect. The isolation transformer can be constructed to minimize the stray capacitance Cp. The switching frequency can be set as low as possible. However, limit for these two design optimizations does exist due to other design constrains such as transformer size and power losses requirements.

The way that isolation transformer 120 is connected in a circuit is also critical. To minimize the charge pump effect, primary and secondary windings 122 and 124 of isolation transformer 120 should be connected in such a way that the total voltage produced by these two windings in the charging path is at the minimum. From this standpoint, the worst connection of isolation transformer 120 occurs where the voltages from both primary and secondary windings reinforce each other.

Figure 7:
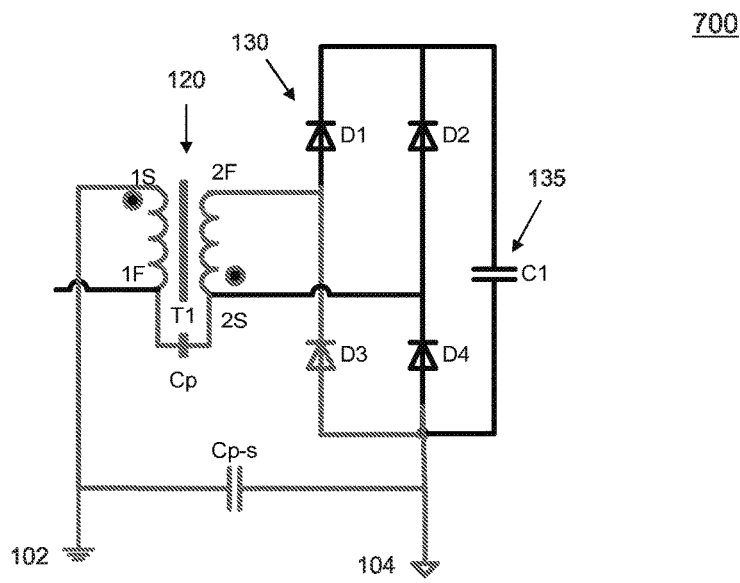
FIG. 7 illustrates a portion of another example of isolating power supply.

FIG. 7 illustrates a circuit 700 of an isolating power supply. Reference numbers and characters in FIG. 7 that are the same as in FIG. 1 designate the same elements and features, a description of which will not be repeated.

A difference between circuit 700 and circuit 200 is the way that isolation transformer 120 is connected on the primary side in circuit 700. In particular, with this connection, the voltages from both primary and secondary windings 122 and 124 of isolation transformer 120 reinforce each other. As a result the charge pump effect generated by circuit 700 is worse than that of circuit 200.

Figure 8:
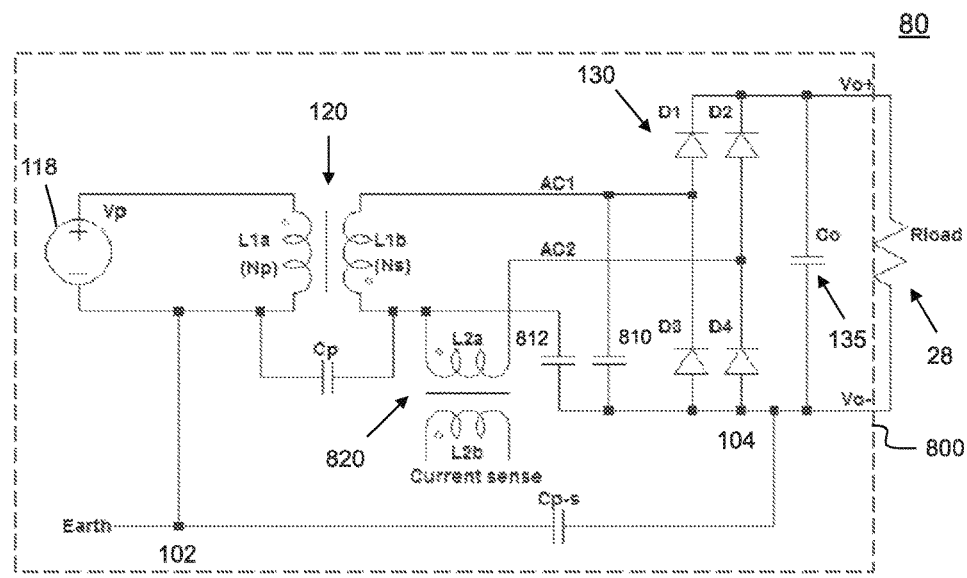
FIG. 8 illustrates an example of an apparatus which includes an isolating power supply with compensation means for compensating for an increase in an output voltage due to a charge pump effect created by parasitic capacitances.

FIG. 8 illustrates an example of an apparatus 80 which includes an isolating power supply having a circuit 800 with compensation means for compensating for an increase in an output voltage due to a charge pump effect created by parasitic capacitances. Reference numbers and characters in FIG. 8 that are the same as in FIG. 1 designate the same elements and features, a description of which will not be repeated.

The circuit 800 of apparatus 800 is similar to circuit 500A, with the following significant differences.

First, circuit 800 includes an AC voltage source 118 in lieu of inverter 100. It should be understood that either inverter 110 or AC voltage source 118 could be employed with the circuits of FIGS. 4A-D and 5A-B.

Also, circuit 800 includes as compensation elements one or both of compensation capacitors 810 and/or 812, as discussed above with respect to FIGS. 4A-D and 5A-B.

Furthermore, in many cases it would be desirable to bring current information from the secondary side of isolation transformer 120 back to the primary side for control by a controller. Toward this end, circuit 800 includes a (small) current sense transformer 820 in the secondary AC current path.

Beneficially, the sensed current should however not include the current generated by first/second compensation capacitor(s) 810 or 812, since this will give a distorted measurement which becomes clearly visible when going to low output currents.

By placing current sense transformer 820 in the right location one can still have the compensation for parasitic capacitance Cp by the added compensation capacitor(s) 810 and/or 812, and maintain an accurate current measurement. Here, current sense transformer 820 has a primary winding connected between one of the output terminals of isolation transformer 120 and one of the input terminals of rectifier 130, and second capacitor 812 is connected between the one of the output terminals of isolation transformer 120 and one of the output terminals of rectifier 130.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for supplying power to a light emitting diode (LED) load, the apparatus comprising:
   an isolation transformer having a pair of input terminals (1S/1F) configured to receive AC electrical power and having a pair of output terminals (2S/2F), wherein the isolation transformer provides DC isolation between the input terminals at a primary side thereof and the output terminals at a secondary side thereof;
   a rectifier having a pair of input terminals and a pair of output terminals, wherein the input terminals of the rectifier are connected to the output terminals of the isolation transformer and the output terminals of the rectifier are connected across the LED load, and wherein the rectifier comprises:
   a first diode (D1) connected from a first one of the input terminals of the rectifier to a first one of the output terminals of the rectifier,
   a second diode (D2) connected from a second one of the input terminals of the rectifier to the first one of the output terminals of the rectifier,
   a third diode (D3) connected from a second one of the output terminals of the rectifier to the first one of the input terminals of the rectifier, and
   a fourth diode (D4) connected from the second one of the output terminals of the rectifier to the second one of the input terminals of the rectifier; and
   first and second capacitors, wherein a first capacitance of the first capacitor is approximately the same as a second capacitance of the second capacitor, and wherein either:
   the first capacitor is connected across the first diode (D1) and the second capacitor is connected across the second diode (D2), or the first capacitor is connected across the third diode and the second capacitor is connected across the fourth diode (D4),
wherein the isolation transformer has a parasitic capacitance between one of the input terminals and one of the output terminals, and wherein the first capacitance and the second capacitance are each larger than the parasitic capacitance.

2. The apparatus of claim 1, wherein the first capacitance and the second capacitance are each at least twice the parasitic capacitance.

3. The apparatus of claim 1, wherein the first capacitance and the second capacitance are each at least approximately ten times the parasitic capacitance.

4. The apparatus of claim 1, further comprising a current sense transformer configured to sense a current at the secondary side of the isolation transformer, wherein the current sense transformer has a primary winding connected between one of the output terminals of the isolation transformer and one of the input terminals of the rectifier, and wherein the second capacitor is connected between the one of the output terminals of the isolation transformer and one of the output terminals of the rectifier.

5. The apparatus of claim 1, further comprising an AC supply connected to the input terminals of the isolation transformer and configured to supply the AC electrical power to the isolation transformer.

6. The apparatus of claim 5, wherein the AC supply is configured to supply the AC electrical power at a frequency of at least 10 kHz.

7. The apparatus of claim 5, wherein the AC supply is configured to supply the AC electrical power at a frequency of between approximately 40 kHz and approximately 100 kHz.

8. The apparatus of claim 5, wherein the AC supply comprises a power inverter.

9. The apparatus of claim 1, further comprising the LED load wherein the LED load comprises at least one LED string.

10. An apparatus for supplying power to a light emitting diode (LED) load, the apparatus comprising:
an isolation transformer having a pair of input terminals (1S/1F) configured to receive AC electrical power and having a pair of output terminals (2S/2F), wherein the isolation transformer has a parasitic capacitance (Cp) between one of the input terminals and one of the output terminals, and wherein the isolation transformer provides DC isolation between the input terminals at a primary side thereof and the output terminals at a secondary side thereof;
a rectifier having a pair of input terminals and a pair of output terminals, wherein the input terminals of the rectifier are connected to the output terminals of the isolation transformer and the output terminals of the rectifier are connected across the LED load, and wherein the rectifier comprises a plurality of diodes (D1/D2/D3/D4) connected in a diode bridge; and
a compensation capacitor connected across one of the diodes of the diode bridge,
wherein a capacitance of the compensation capacitor is about the same as the parasitic capacitance.

11. The apparatus of claim 10, wherein the capacitance of the compensation capacitor is approximately the same as the parasitic capacitance.

12. The apparatus of claim 10, further comprising an AC supply connected to the input terminals of the isolation transformer and configured to supply the AC electrical power to the isolation transformer.

13. The apparatus of claim 12, wherein the AC supply is configured to supply the AC electrical power at a frequency of at least 10 kHz.

14. The apparatus of claim 12, wherein the AC supply is configured to supply the AC electrical power at a frequency of between approximately 40 kHz and approximately 100 kHz.

15. The apparatus of claim 10, wherein the diode bridge comprises:
a first diode (D1) connected from a first one of the input terminals of the rectifier to a first one of the output terminals of the rectifier,
a second diode (D2) connected from a second one of the input terminals of the rectifier to the first one of the output terminals of the rectifier,
a third diode (D3) connected from a second one of the output terminals of the rectifier to the first one of the input terminals of the rectifier, and
a fourth diode (D4) connected from the second one of the output terminals of the rectifier to the second one of the input terminals of the rectifier,
wherein the compensation capacitor is connected across one of the first, second, third, and fourth diodes.

16. An apparatus for supplying power to a light emitting diode (LED) load, the apparatus comprising:
an isolation transformer having a pair of input terminals (1S/1F) configured to receive AC electrical power and having a pair of output terminals (2S/2F), wherein the isolation transformer provides DC isolation between the input terminals at a primary side thereof and the output terminals at a secondary side thereof;
a rectifier having a pair of input terminals and a pair of output terminals, wherein the input terminals of the rectifier are connected to the output terminals of the isolation transformer and the output terminals of the rectifier are connected across the LED load, and wherein the rectifier comprises:
a first diode (D1) connected from a first one of the input terminals of the rectifier to a first one of the output terminals of the rectifier,
a second diode (D2) connected from a second one of the input terminals of the rectifier to the first one of the output terminals of the rectifier,
a third diode (D3) connected from a second one of the output terminals of the rectifier to the first one of the input terminals of the rectifier, and
a fourth diode (D4) connected from the second one of the output terminals of the rectifier to the second one of the input terminals of the rectifier; and
first and second capacitors, wherein a first capacitance of the first capacitor is approximately the same as a second capacitance of the second capacitor, and wherein either:
the first capacitor is directly connected between the first one of the input terminals of the rectifier to second one of the output terminals of the rectifier across the first diode (D1) and the second capacitor is directly connected between the second one of the input terminals of the rectifier to second one of the output terminals of the rectifier across the second diode (D2), or the first capacitor is directly connected between the first one of the input terminals of the rectifier to first one of the output terminals of the rectifier across the third diode (D3) and the second capacitor is directly connected between the first second of the input terminals of the rectifier to first one of the output terminals of the rectifier across the fourth diode (D4).

* * * * *